(12) United States Patent
Bushnell

(10) Patent No.: US 6,320,955 B1
(45) Date of Patent: Nov. 20, 2001

(54) REMOTE ACTIVATION OF CALL TRACE

(75) Inventor: William Jackson Bushnell, St. Charles, IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/259,236

(22) Filed: Mar. 1, 1999

(51) Int. Cl.[7] .............................. H04M 7/00; H04M 1/56; H04M 3/22; H04M 3/523
(52) U.S. Cl. ................ 379/246; 379/32.05; 379/221.09; 379/221.1; 379/265.01
(58) Field of Search ..................... 379/112, 113, 379/115, 116, 119, 120, 121, 122, 126, 127, 133, 134, 135, 142, 219, 242, 245, 246, 247, 249, 209, 265, 266, 309, 112.01, 115.01, 121.01, 221.08, 221.09, 221.1, 265.01, 32.05

(56) References Cited

U.S. PATENT DOCUMENTS

| 5,268,958 | * | 12/1993 | Nakano | 379/265 X |
| 5,333,183 | * | 7/1994 | Herbert | 379/126 X |
| 5,537,470 | * | 7/1996 | Lee | 379/266 |
| 5,703,943 | * | 12/1997 | Otto | 379/209 X |

* cited by examiner

Primary Examiner—Harry S. Hong

(57) ABSTRACT

A method for identifying a route of a call in a telecommunication system (10) comprises the steps of routing the call from a telephonic calling device (12) via a telephonic switch (14) to a telephonic terminating device (56) and disconnecting the telephonic call. After the telephonic call is disconnected, a call trace is established to identify a called line number of a terminating line in response to a call trace request from the telephonic calling device (12) after the telephonic call is disconnected.

28 Claims, 3 Drawing Sheets

FIG. 2

| CALLING NUMBER OF A TELEPHONIC CALLING DEVICE 76 | CALLED NUMBER OF A TELEPHONIC TERMINATING DEVICE 78 | ORIGINATING CALL RECORD 74 DATE OF A TELEPHONIC CALL 80 | TIME OF A TELEPHONIC CALL 82 |
|---|---|---|---|
| 312-555-5555 | 312-443-5678 | 1/7/99 | 13:45 |
| 312-567-8901 | 312-987-6543 | 1/7/99 | 11:01 |
| 312-123-4567 | 312-876-5432 | 1/7/99 | 10:33 |
| 312-234-5678 | 312-765-4321 | 1/7/99 | 10:32 |
| 312-345-6789 | 312-654-3210 | 1/6/99 | 23:58 |
| 312-456-7890 | 312-543-2109 | 1/6/99 | 23:55 |
| ... | ... | ... | ... |

*FIG. 3*

TERMINATING CALL RECORD 84

| CALLING NUMBER OF A TELEPHONIC CALLING DEVICE 86 | CALLED NUMBER OF A TELEPHONIC TERMINATING DEVICE 88 | DATE OF A TELEPHONIC CALL 90 | TIME OF A TELEPHONIC CALL 92 | LINE NUMBER OF A TERMINATING LINE THAT SERVICED A TELEPHONIC TERMINATING DEVICE 94 |
|---|---|---|---|---|
| 312-555-5555 | 312-443-5678 | 1/7/99 | 13:45 | 1 |
| 312-567-8901 | 312-987-6543 | 1/7/99 | 11:01 | 5 |
| 312-123-4567 | 312-876-5432 | 1/7/99 | 10:33 | 2 |
| 312-234-5678 | 312-765-4321 | 1/7/99 | 10:32 | 7 |
| 312-345-6789 | 312-654-3210 | 1/6/99 | 23:58 | 3 |
| 312-456-7890 | 312-543-2109 | 1/6/99 | 23:55 | 4 |
| ... | ... | ... | ... | ... |

REMOTE ACTIVATION OF CALL TRACE

TECHNICAL FIELD

This invention relates to telecommunication systems and methods which perform call tracing on telephonic calls.

BACKGROUND OF THE INVENTION

The world-wide increase in telecommunications has created a need for faster communications and easier access to the systems that enable the telecommunications. Because of this global expansion, it is often difficult to establish and maintain a connection with a telecommunication system. For some services, a called telephonic number may selectively be associated with many terminating lines or physical terminations. Therefore, for these services there is a need to be able to quickly identify a terminating line that serviced a telephonic terminating device that is not working properly or is detective.

In existing telecommunication systems, a call trace identifies the calling party of a telephonic call. After a called party receives a harassing telephonic call, the called party must disconnect the telephonic call and receive a dial tone to be able to activate a call trace. Then the called party activates the call trace by dialing an activation code such as *77. After dialing the code, a call record containing the calling party, called party and time of day is printed on a security channel of the telephonic switching system that serves the called party.

Disadvantageously, existing call tracing techniques do not permit the calling party to originate a call trace. This is needed when the called number is associated with a multitude of terminating lines. For example, the terminating lines could be multi-line hunt groups or automatic call distributors. Thus, the calling party is unable to determine the terminating line of a telephonic call. In turn, errors in telecommunication systems are undetected and are not promptly fixed. Because errors are not detected, there is a decrease in the response time for access to the telecommunication system.

SUMMARY OF THE INVENTION

The above problems are solved in the present invention by a call trace originating from a telephonic calling device to identify call terminating lines thus reducing response times for repairing problems and to allow easier access to telecommunication systems. The call trace is established from the telephonic calling device after completion of the telephonic call to a telephonic terminating device with a service problem. The present invention extends the use of call tracing by generating a report that specifies the terminating line of the telephonic call to identify terminating lines that are malfunctioning.

After a telephonic call has been disconnected, in response to a call trace request from the telephonic calling device a call trace is established to determine the terminating line of the telephonic call. After the terminating line of the telephonic call is determined, a call trace record is generated from a terminating call record. Importantly, the call trace record indicates the terminating line that connected the telephonic call from the telephonic calling device to the telephonic terminating device. The call trace record is transmitted to a call trace record database.

BRIEF DESCRIPTION OF THE DRAWINGS

The advantages of the present invention will be explained in greater detail and others will be made apparent from the detailed description of the preferred embodiment which references several of the devices in the following drawings, in which:

FIG. 2 is a table of an originating call record displaying a calling number of a telephonic calling device, a called number of a telephonic terminating device, a date of a telephonic call and a time of a telephonic call; and FIG. 3 is a table of a terminating call record displaying a called line number of a terminating line that serviced a telephonic terminating device.

DETAILED DESCRIPTION

Figure 1:
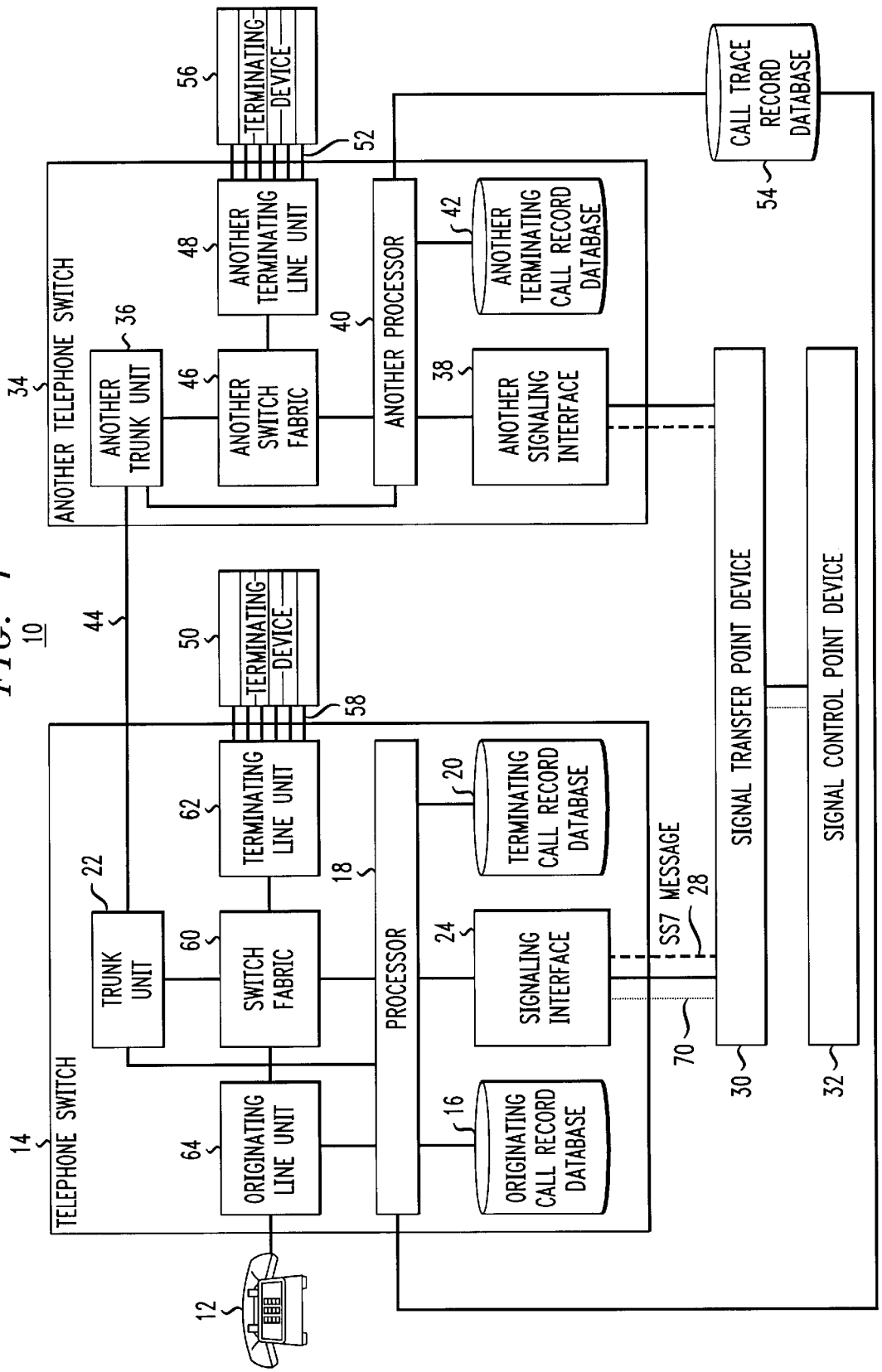
FIG. 1 is a block diagram of a telecommunication system with telephonic switches, a signal transfer point device, a signal control point device and a call trace record database.

Referring now to FIG. 1, a telecommunication system 10 is shown having a telephonic switch 14 for communicating with a signal transfer point device 30 and another telephonic switch 34. The telephonic switches 14 and 34 may selectively be any telephonic network switches in the public switched telephonic network (PSTI) such as a 5ESS switches sold by Lucent Technologies Inc. A telephonic calling device 12 as seen in FIG. 1, is associated with and coupled to the telephonic switch 14. The telephonic calling device 12 may preferably be either a telephone or a personal computer. However, any communication device that is capable of accessing, and communicating signals with the telephonic switch 14 may be suitably employed as an acceptable telephonic calling device 12.

It will be appreciated that call tracing permits a call trace to originate from a telephonic called device. In response to an activation code signaling a request for call tracing, call tracing is initiated from a telephonic called device to provide a calling number of a telephonic calling device to the telephonic called device. The present invention extends the use of call tracing by enabling a call trace to originate at a telephonic calling device 12. A call trace that originates at the telephonic calling device 12 results in a call trace record to be generated and transmitted to a call trace record database 54. The call trace record identifies a calling number of the telephonic calling device 12, a called number of a telephonic terminating device and a called line number of a terminating line that serviced a telephonic terminating device. Advantageously, by delivering the called line number of the terminating line that serviced the telephonic terminating device errors in the telephonic terminating device are detectable rendering telephonic communication errors to be fixed. For example, a telephonic call may selectively be transmitted to a terminating line in a group of terminating lines 58 that is connected to a detective telephonic terminating device. By establishing call tracing in response to receipt of a call tracing request from a telephonic calling device 12, quick identification of the defective terminating line can be made thereby reducing errors.

As seen in FIG. 1, the telephonic calling device 12 by being physically located in a particular region is generally associated and connected with the telephonic switch 14. The telephonic switch 14 has a processor 18 to perform processing for call routine at the telephonic switch 14. The processor 18 communicates with the telephonic calling device 12 and a signaling interface 24 and determines the voice and data communication paths in the telecommunication system 10. The telephonic switch 14 has a trunk unit 22 to allow data and voice communications between the telephonic calling device 12 and the other telephonic switch 34. The telephonic switch 14 has an originating line unit 64 that receives the telephonic call from the telephonic calling device 12. The originating line unit 64 transmits signaling information to the processor 18 and transmits voice and data communications to a switch fabric 60 of the telephonic switch 14. The switch fabric 60 of the telephonic switch 14 connects the originating line unit 64 to enable voice and data communications between the telephonic calling device 12 and a telephonic terminating device. The telephonic switch 14 has a terminating line unit 62 that connects the telephonic call to a terminating line in a call distribution application 58.

The telephonic switch 14 also has an originating call record database 16 to record an originating call record, maintain the originating call record for a predetermined set time and record data associated with various originating call records for telephonic calls. The originating call record database 16 also preferably stores the various originating call records in chronological order. The originating call record may selectively be stored in the originating call record database 16 for ten days.

As seen in FIG. 2, an originating call record 74 contains a calling number of a telephonic calling device 76, a called number of a telephonic terminating device 78, a date of a telephonic call 80 and a time of a telephonic call 82.

Referring back to FIG. 1, the telephonic switch 14 also has a terminating call record database 20 to record a terminating call record, maintain the terminating call record for a predetermined set time and record data associated with various terminating call records for telephonic calls. The terminating call record database 20 also preferably stores the various terminating call records in chronological order. The terminating call record may selectively be stored in the terminating call record database 20 for ten days.

As seen in FIG. 3, a terminating call record 84 contains a calling number of a telephonic calling device 86, a called number of a telephonic terminating device 88, a date of a telephonic call 90, a time of a telephonic call 92 and a called line number of a terminating line that serviced a telephonic terminating device 94.

Referring back to FIG. 1, during operation of the present invention a telephonic call is transmitted from the telephonic calling device 12 to the processor 18 of the telephonic switch 14. The processor 18 of the telephonic switch 14 determines if the telephonic terminating device has an associated 800 prefix telephone number. If the telephonic terminating device has an associated 800 prefix telephone number, then a translation query 70 is transmitted from the processor 18 of the telephonic switch 14 to the signaling interface 24 of the telephonic switch 14. The signaling interface 24 enables communication between the telephonic switch 14 and a signal transfer point 30. The signal transfer point 30 permits telephonic communications to be transmitted from the signaling interface 24 of the telephonic switch 14 to a signal control point device 32. The signal transfer point device 30 is preferably a signaling transfer point (STP) packet switch device. The signal control point device 32 stores information that is used by telephonic switches to route telephonic calls.

The translation query 70 is transmitted from the signaling interface 24 of the telephonic switch 14 to the signal transfer point device 30. The translation query 70 is transmitted from the signal transfer point device 30 to the signal control point device 32. The signal control point device 32 determines a ten digit code for the 800 prefix telephone number. The ten digit code for the 800 prefix telephone number is transmitted from the signal control point device 32 to the signal transfer point device 330. The ten digit code for the 800 prefix telephone number is transmitted from the signal transfer point device 30 to the signaling interface 24 of the telephonic switch 14. The ten digit code for the 800 prefix telephone number is transmitted from the signaling interface 24 of the telephonic switch 14 to the processor 18 of the telephonic switch 14. The ten digit code for the 800 prefix telephone number is transmitted from the processor 18 of the telephonic switch 14 to the originating call record database 16 of the telephonic switch 14. The ten digit code for the 800 prefix telephone number is recorded in an originating call record.

However, if the telephonic terminating device does not have an associated 800 prefix telephone number, then information concerning the telephonic call is transmitted from the processor 18 of the telephonic switch 14 to the originating call record database 16 of the telephonic switch 14. An originating call record for the telephonic call is recorded at the originating call record database 16 of the telephonic switch 14.

The processor 18 of the telephonic switch 14 retrieves the originating call record for the telephonic call from the originating call record database 16 of the telephonic switch 14. The processor 18 of the telephonic switch 14 determines if the telephonic switch 14 services the called number of the telephonic terminating device. If the telephonic switch 14 services the called number of the telephonic terminating device 50 that is coupled with the terminating line unit 62, then the telephonic switch 14 determines a called line number of a terminating line that services the called number of the telephonic terminating device 50. If the telephonic switch 14 determines that the called number of the telephonic terminating device 50 is assigned to a group of terminating lines 58, the telephonic switch 14 executes a call distribution algorithm or a call distribution application that is stored at the telephonic switch 14 to determine which terminating line in the group of terminating lines 58 will be used to service the telephonic call to the telephonic terminating device 50. The call distribution algorithm may selectively include a uniform call distribution, a circular hunt distribution and an automatic call distribution. The telephonic switch 14 transmits the telephonic call to a terminating line in the group of terminating lines 58. The telephonic terminating device 50 may selectively be any suitable communication device such as a modem, an interactive voice response unit, a voice mail unit, an attendant console, a called telephonic device and the like. When the telephonic call is serviced to the telephonic terminating device 50, a terminating call record for the telephonic call is recorded at the terminating call record database 20 of the telephonic switch 14.

However, if the processor 18 of the telephonic switch 14 determines that the other telephonic switch 34 services the called number of the telephonic terminating device 56 that is coupled with a terminating line unit 48, a standard interoffice trunk connection 44 is established between telephonic switch 14 and telephonic switch 34. The standard interoffice trunk connection 44 allows voice and data communications between the telephonic calling device 12 and the telephonic terminating device 56. To establish the standard interoffice trunk connection 44, the telephonic switch 14 transmits the calling number of the telephonic calling device 12 and the called number of the telephonic terminating device 56 to the telephonic switch 34. The calling number of the telephonic calling device 12 and the called number of the telephonic terminating device 56 are transmitted from the processor 18 of the telephonic switch 14 to a signaling interface 24 of the telephonic switch 14. The signaling interface 24 enables communication between the telephonic switch 14 and a signal transfer point device 30. The signal transfer point device 30 permits telephonic communications to be transmitted from the signaling interface 24 of the telephonic switch 14 to a signaling interface 38 of the other telephonic switch 34 that services the telephonic calling device 56. The signal transfer point device 30 is preferably a signaling transfer point (STP) packet switch device. The STP determines which of the other telephonic switches services the telephonic terminating device 56.

A data packet message carrying the calling number of the telephonic calling device 12 and the called number of the telephonic terminating device 56 is transmitted from the signaling interface 24 of the telephonic switch 14 to the signal transfer point device 30. The data packet message may selectively be an SS7 message 28. The SS7 message 28 is a call set-up request to establish a communication with telephonic switch 34. The signal transfer point device 30 determines whether telephonic switch 34 is able to receive the data packet message. The data packet message is then transmitted from the signal transfer point device 30 to the signaling interface 38 of telephonic switch 34.

If the other telephonic switch 34 services the called number of the telephonic terminating device 56 that is Coupled with the terminating line unit 48, then telephonic switch 34 determines a called line number of a terminating line that services the called number of the telephonic terminating device 56. If telephonic switch 34 determines that the called number of the telephonic terminating device 56 is assigned to a group of terminating lines 52, telephonic switch 34 executes a call distribution algorithm or a call distribution application that is stored at telephonic switch 34 to determine which terminating line in the group of terminating lines 52 will be used to service the telephonic call to the telephonic terminating device 56. The call distribution algorithm may selectively include a uniform call distribution, a circular hunt distribution and an automatic call distribution. The telephonic terminating device 56 may selectively be any suitable communication device such as a modem, an interactive voice response unit, a voice mail unit, an attendant console, a called telephonic device and the like. Telephonic switch 34 transmits the telephonic call to a terminating line in the group of terminating lines 52.

The processor 40 of telephonic switch 34 permits voice and data communications at telephonic switch 34. The processor 40 receives telephonic calls from the signaling interface 38 of telephonic switch 34 and determines the paths that the telephonic calls should follow. Telephonic switch 34 has a trunk unit 36 to allow data and voice communications between the telephonic calling device 12 and the telephonic terminating device 56. Telephonic switch 34 has a switch fabric 46 that connects the trunk unit 36 of telephonic switch 34 and a terminating line unit 48 to enable voice and data communications between the telephonic calling device 12 and the telephonic terminating device 56.

Telephonic switch 34 also has a terminating call record database 42 to record a terminating call record for the telephonic call, maintain the terminating call record for a predetermined set time and record data associated with various terminating call records for telephonic calls. The terminating call record database 42 also preferably stores the various terminating call records in chronological order. The terminating call record may selectively be stored in the terminating call record database 42 for ten days.

As seen in FIG. 3, a terminating call record 84 contains a calling number of a telephonic calling device 86, a called number of a telephonic terminating, device 88, a date of a telephonic call 90, a time of a telephonic call 92 and a called line number of a terminating line that serviced a telephonic terminating device 94.

Referring back to FIG. 1, the calling number of the telephonic calling device 12 and the called number of the telephonic terminating device 56 are transmitted from the signaling interface 38 to the processor 40 of the other telephonic switch 34. The calling number of the telephonic calling device 12 and the called number of the telephonic terminating device 56 are transmitted from the processor 40 of telephonic switch 34 to the terminating call record database 42 of telephonic switch 34. A terminating call record for the telephonic call is recorded at the terminating call record database 42 of telephonic switch 34 when the telephonic call is serviced to the telephonic terminating device 56.

In establishing a call trace from the telephonic calling device 12, the telephonic call is disconnected and a dial tone is provided to the telephonic calling device 12. A call trace request is transmitted from the telephonic calling device 12 to the processor 18 of the telephonic switch 14 in response to receipt of a call trace activation code signal from the telephonic calling device 12. The call trace request may selectively be initiated in many ways such as through activation of a key pad (*77) at the telephonic calling device 12. In response to receipt of the call trace request from the telephonic calling device 12, a call trace is established to identify the called line number of the terminating line that serviced the telephonic terminating device. The processor 18 of the telephonic switch 14 retrieves the originating call record for the telephonic call from the originating call record database 16. The processor 18 determines the appropriate originating call record by selecting the latest originating call record for the calling number of the telephonic calling device 12. The processor 18 of the telephonic switch 14 determines where the call trace request should be transmitted based on the called number of the telephonic terminating device.

If the processor 18 of the telephonic switch 14 determines that the telephonic switch 14 serviced the telephonic call, then the processor 18 of the telephonic switch 14 searches the terminating call record database 20 to retrieve the most recent terminating call record with the calling number of the telephonic calling device 12 and the called number of the telephonic terminating device 50. The processor 18 of the telephonic switch 14 then generates a call trace record. The call trace record contains the calling number of the telephonic calling device 12, the called number of the telephonic terminating device 50, the date of the telephonic call, the time of the telephonic call and the called line number of the terminating line that serviced the telephonic terminating device 50.

The call trace record is transmitted from the processor 18 of the telephonic switch 14 to a call trace record database 54. The call trace record database 54 is preferably a management organization that services repairs to the telecommunication system 10.

However, if the processor 18 of the telephonic switch 14 determines that the telephonic switch 14 did not terminate the telephonic call then a remote activation of call trace message is transmitted from the processor 18 of the telephonic switch 14 to the signaling interface 24 of the telephonic switch 14. The remote activation of call trace message contains the call trace request and the originating call record. A data packet message carrying the remote activation of call trace message is transmitted from the signaling interface 24 of the telephonic switch 14 to the signal transfer point device 30. The data packet message may selectively be an SS7 message 28. The SS7 message is a call trace set-up request. The signal transfer point device 30 determines whether the other telephonic switch 34 is able to receive the data packet message.

The data packet message is transmitted from the signal transfer point device 30 to the signaling interface 38 of the other telephonic switch 34. The remote activation of call trace message is transmitted from the signaling interface 38 of telephonic switch 34 to the processor 40 of telephonic switch 34. The processor 40 of telephonic switch 34 examines the call trace request message to determine the calling number of the telephonic calling device 12 and the called number of the telephonic terminating device 56. The processor 40 of telephonic switch 34 then searches the terminating call record database 42 to retrieve the most recent terminating call record with the calling number of the telephonic calling device 12 and the called number of the telephonic terminating device 56. The processor 40 of telephonic switch 34 then retrieves from the terminating call record database 42 the called line number of the terminating line that serviced the telephonic terminating device 56. The processor 40 of telephonic switch 34 then generates a call trace record. The call trace record contains the calling number of the telephonic calling device 12, the called number of the telephonic terminating device 56, the date of the telephonic call, the time of the telephonic call and the called line number of the terminating line that serviced the telephonic terminating device 56.

The call trace record is transmitted from the processor 40 of telephonic switch 34 to a call trace record database 54. The call trace record database 54 preferably embodies a management organization application that services repairs to the telecommunication system 10.

While a detailed description of the preferred embodiments of the invention have been given, it should be appreciated that many variations can be made thereto without departing from the scope of the invention as set forth in the appended claims.

What is claimed is:

1. A method for identifying a route of a telephonic call in a telecommunication system having at least one telephonic switch, a telephonic calling device and a telephonic terminating device, comprising the steps of:

routing the telephonic call from the telephonic calling device via the telephonic switch to the telephonic terminating device;

disconnecting the telephonic call; and establishing a call trace after the telephonic call is disconnected to identify a called line number of a terminating line in response to a call trace request from the telephonic calling device after the telephonic call is disconnected.

2. The method of claim 1 in which routing the telephonic call from the telephonic calling device via the telephonic switch to the telephonic terminating device includes the step of routing the telephonic call from the telephonic switch via another telephonic switch to the telephonic terminating device.

3. The method of claim 2 including the steps of recording an originating call record at an originating call record database of the telephonic switch, maintaining the originating call record at the originating call record database of the telephonic switch for a predetermined set time, recording data associated with a plurality of originating call records for a plurality of telephonic calls at the originating call record database of the telephonic switch, and storing the plurality of originating call records in chronological order.

4. The method of claim 3 including the steps of determining that the telephonic terminating device has an associated 800 prefix telephone number, transmitting a translation query from the telephonic switch to a signaling transfer point device, transmitting the translation query from the signaling transfer point device to a signal control point device, determining a ten digit code for the 800 prefix telephone number, and recording the ten digit code in the originating call record.

5. The method of claim 3 in which the originating call record includes at least one of:

(a) a calling number of the telephonic calling device, (b) a called number of the telephonic terminating device, (c) a date of the telephonic call, and (d) a time of the telephonic call.

6. The method of claim 3 including the steps of transmitting a calling number of the telephonic calling device and a called number of the telephonic terminating device from the processor of the telephonic switch to a signaling interface associated with the telephonic switch, transmitting a data packet message carrying the calling number of the telephonic calling device and the called number of the telephonic terminating device from the signaling interface associated with the telephonic switch to a signal transfer point device, determining at the signal transfer point device that the other telephonic switch that services the telephonic terminating device is able to receive the data packet message, transmitting the calling number of the telephonic calling device and the called number of the telephonic terminating device from the signal transfer point device to another signaling interface associated with the other telephonic switch, transmitting the calling number of the telephonic calling device and the called number of the telephonic terminating device from the other signaling interface associated with the other telephonic switch to another processor of the other telephonic switch, and transmitting the calling number of the telephonic calling device and the called number of the telephonic terminating device from the other processor of the other telephonic switch to another terminating call record database of the other telephonic switch.

7. The method of claim 2 including the step of utilizing a call distribution algorithm to distribute the telephonic call to the telephonic terminating device, serviced by the other telephonic switch.

8. The method of claim 7 including the step of determining if a terminating line in a plurality of terminating lines is available to terminate the telephonic call to the telephonic terminating device.

9. The method of claim 2 including the step of recording a terminating call record at a terminating call record database, maintaining the terminating call record at the terminating call record database for a predetermined set time, recording data associated with a plurality of terminating call records for a plurality of telephonic calls at the terminating call record database, and storing the plurality of terminating call records in chronological order.

10. The method of claim 9 in which the terminating call record includes at least one of:
(a) a calling number of the telephonic calling device,
(b) a called number of the telephonic terminating device,
(c) a date of the telephonic call
(d) a time of the telephonic call, and
(e) a called line number of the terminating line that serviced the telephonic terminating device.

11. The method of claim 1 in which the step of establishing the call trace includes the steps of establishing a dialtone at the telephonic calling device, and transmitting the call trace request from the telephonic calling device to the telephonic switch in response to receipt of a call trace activation code signal from the telephonic calling device.

12. The method of claim 11 including the steps of retrieving at a processor of the telephonic switch an originating call record for the telephonic call from an originating call record database of the telephonic switch, determining from the originating call record a calling number of the telephonic calling device and a called number of the telephonic terminating device, and transmitting a remote activation of call trace message carrying the call trace request and the originating call record from the processor of the telephonic switch that originated the telephonic call to a signaling interface associated with the telephonic switch.

13. The method of claim 12 including the steps of transmitting a data packet message carrying the remote activation of call trace message from the signaling interface associated with the telephonic switch to a signal transfer point device, transmitting the data packet message from the signal transfer point device to another signaling interface associated with another telephonic switch, and transmitting the remote activation of call trace message from the other signaling interface associated with the other telephonic switch to another processor of the other telephonic switch.

14. The method of claim 13 including the steps of retrieving at the other processor of the other telephonic switch the terminating call record of the telephonic call from the terminating call record database of the other telephonic switch, and generating a call trace record at the other processor of the other telephonic switch.

15. The method of claim 14 in which the call trace record includes at least one of:
(a) the calling number of the telephonic calling device,
(b) the called number of the telephonic terminating device,
(c) a date of the telephonic call,
(d) a time of the telephonic call, and
(e) a called line number of the terminating line that serviced the telephonic terminating device.

16. The method of claim 14 including the step of transmitting the call trace record from the other processor of the other telephonic switch to a call trace record database.

17. The method of claim 1 in which the step of establishing the call trace includes the steps of establishing a dialtone at the telephonic calling device, transmitting the call trace request from the telephonic calling device to the telephonic switch in response to receipt of a call trace activation code signal from the telephonic calling device, retrieving at a processor of the telephonic switch an originating call record for the telephonic call from an originating call record database of the telephonic switch, retrieving at a processor of the telephonic switch a terminating call record for the telephonic call from a terminating call record database of the telephonic switch, generating a call trace record at the processor of the telephonic switch, and transmitting the call trace record from the processor of the telephonic switch to a call trace record database.

18. The method of claim 1 including the step of determining that another telephonic switch services a called number of the telephonic terminating device.

19. A telecommunication system for identifying a route of a telephonic call having at least one telephonic switch, a telephonic calling device and a telephonic terminating device, comprising:

at least one telephonic switch for routing the telephonic call from the telephonic calling device to the telephonic terminating device;

means for disconnecting the telephonic call; and means for establishing a call trace after the telephonic call is disconnected to identify a called line number of a terminating line in response to a call trace request from the telephonic calling device after the telephonic call is disconnected.

20. The telecommunication system of claim 19 including means for sending the telephonic call to another telephonic switch that services the telephonic terminating device if the telephonic switch does not service a called number of the telephonic terminating device.

21. The telecommunication system of claim 20 including means for transmitting an SS7 message carrying a remote activation of call trace message that carries the call trace request and an originating call record from a signaling interface associated with the telephonic switch to a signal transfer point device, and means for transmitting the SS7 message carrying the remote activation of call trace message that carries the call trace request and the originating call record from the signal transfer point device to another signaling interface associated with the other telephonic switch.

22. The telecommunication system of claim 20 in which the telephonic switch that originated the telephonic call includes an originating call record database for recording an originating call record, maintaining the originating call record for a predetermined set time, recording data associated with a plurality of originating call records for a plurality of telephonic calls and storing the plurality of originating call records in chronological order.

23. The telecommunication system of claim 22 in which the originating call record includes at least one of:
(a) a calling number of the telephonic calling device,
(b) the called number of the telephonic terminating device,
(c) a date of the telephonic call, and
(d) a time of the telephonic call.

24. The telecommunication system of claim 20 including a terminating call record database for recording a terminating call record, maintaining the terminating call record for a predetermined set time, recording data associated with a plurality of terminating call records for a plurality of telephonic calls and storing the plurality of terminating call records in chronological order.

25. The telecommunication system of claim 24 in which the terminating call record includes at least one of:
   (a) a calling number of the telephonic calling device,
   (b) the called number of the telephonic terminating device,
   (c) a date of the telephonic call,
   (d) a time of the telephonic call, and
   (e) a called line number of the terminating line that serviced the telephonic terminating device.

26. The telecommunication system of claim 20 including means for generating a call trace record.

27. The telecommunication system of claim 26 in which the call trace record includes at least one of:
   (a) a calling number of the telephonic calling device,
   (b) the called number of the telephonic terminating device,
   (c) a date of the telephonic call,
   (d) a time of the telephonic call, and
   (e) a called line number of the terminating line that serviced the telephonic terminating device.

28. The telecommunication system of claim 26 including a call trace record database for receiving the call trace record from a processor.

* * * * *